J. J. GILBERT.
HOOF TRIMMING TOOL.
APPLICATION FILED MAY 11, 1920.

1,399,958.  Patented Dec. 13, 1921.

INVENTOR.
JACOB J. GILBERT.
By Edward B. Birkenkeul.
ATTORNEY.

UNITED STATES PATENT OFFICE.

JACOB J. GILBERT, OF SHAW, OREGON.

HOOF-TRIMMING TOOL.

1,399,958.  Specification of Letters Patent.  Patented Dec. 13, 1921.

Application filed May 11, 1920. Serial No. 380,602.

*To all whom it may concern:*

Be it hereby known that I, JACOB J. GILBERT, a citizen of the United States, and resident of Shaw, in the county of Marion and State of Oregon, have invented a new and useful Hoof-Trimming Tool, of which the following is a specification.

This invention relates more particularly to a means for trimming the hoofs of fractious and untamed animals.

The object of my invention is to provide an exceedingly simple and efficient tool whereby one is able to remove any undesirable growth from an animal's hoof without raising it from the ground or coming near enough to the animal to frighten it or be injured by its actions.

Figure 1:
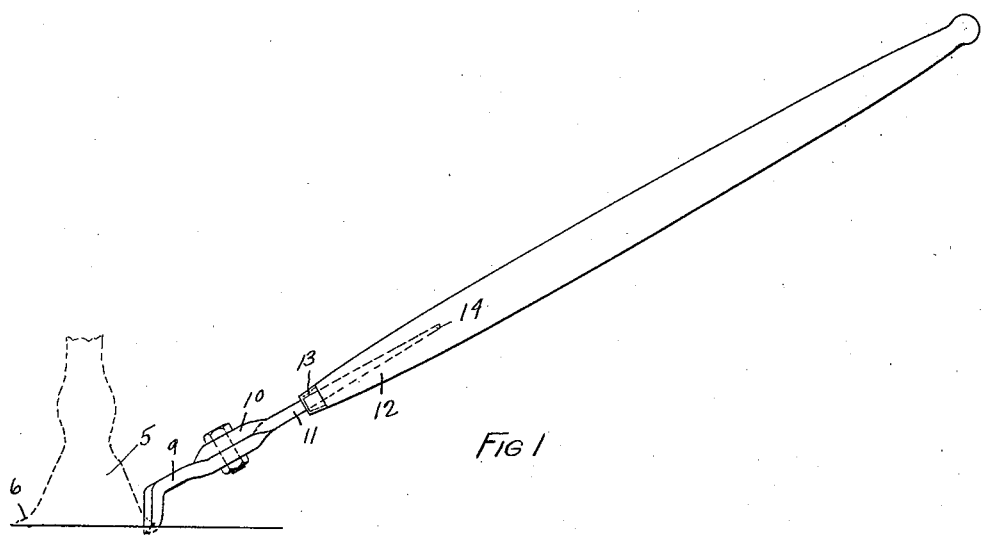
Figure 2:
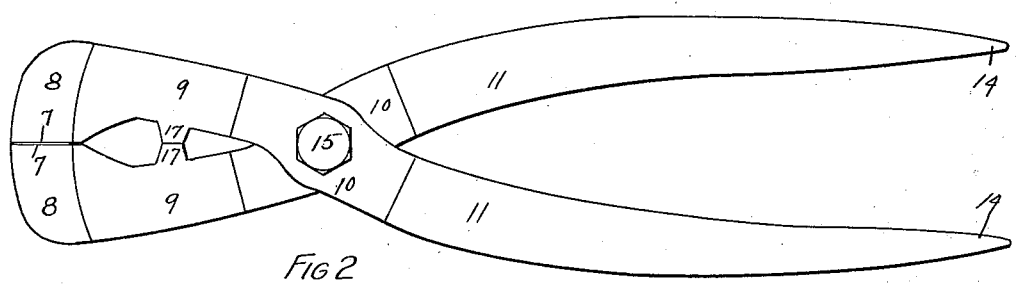
Figure 3:
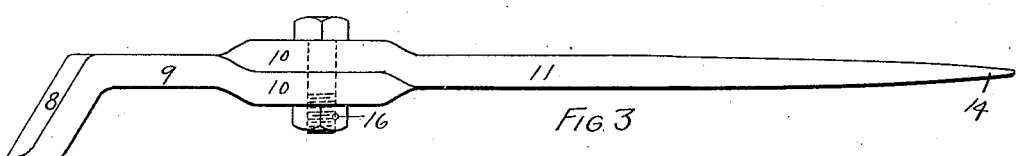
Figure 4:
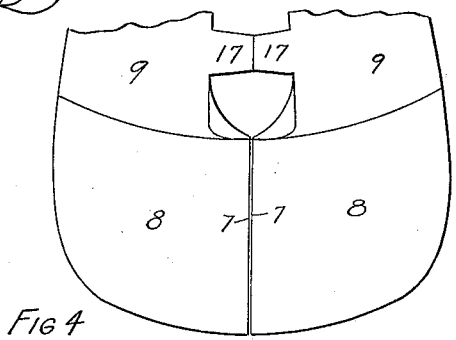

I accomplish these results in the manner set forth in the following specification and illustrated in the accompanying drawing, in which:

Figure 1 is an elevation showing the manner of applying the device to a horse's hoof; Fig. 2 is an enlarged plan showing the trimmer portion of the device, of which Fig. 3 is a side elevation; and Fig. 4 is a still further enlargement showing the cutting edges.

Similar numbers of reference refer to the same or similar parts throughout the several views.

Referring in detail to the drawing, I have shown in dotted lines a horse's hoof 5 whose lower portion 6 requires trimming.

In order to accomplish this operation without undue physical exertion or risk, I have constructed a large pair of side-cutting pliers whose cutting edges 7 are adapted to open as much as six inches and whose faces 8 stand in a vertical position when in operation. These faces form an obtuse angle with the arms 9 which are offset at 10 in order that the arms 9 and the handle shanks 11 may lie in the same plane and the cutting edges 7 are also at an acute angle to the axis of the pivot 15. Wooden handles 12 between two and three feet long are firmly secured to the handle shanks 11 and provided with strong metal ferrules 13 which reinforce same, the points 14 of the handle shanks being of a suitable form to permit of attachment to the wooden handles 12. A bolt 15 acts as a pivot for the two halves of the trimmer, which are prevented from getting out of adjustment by the pin 16 passing through the bolt 15 and its nut.

In order to prevent the cutting edges 7 from injuring each other I have also provided the projections 17 extending laterally from the arms 9, which of course are ground away as required to leave only sufficient clearage between the edges 7.

The method of applying my device is clearly illustrated in Fig. 1 of the drawing and requires no further explanation; but attention is drawn to the fact that in using this device the animal is placed in a slip or stanchion and the party operating the tool stands at a safe distance from the animal, thereby rendering it unnecessary to rope same or unnecessarily frighten it. It will be observed that I have shaped the faces 8 into a convex form. This is essential since it permits the faces to follow the line of the cut without breaking away the hoof, as is now done, which of course leaves a rough edge and requires the use of a smoothing tool.

By holding one handle still and moving the other a scraping action is obtained which smoothly pares the outside of the hoof in one operation. The tips of the cutting faces are also curved but have a different purpose, which is to render it easier to trim under the heel.

Aside from the additional safety resulting from the long handles it follows naturally that a tremendous leverage is gained in this device which permits the complete cutting off of any portion of the hoof, rather than a partial cutting and a final breaking of the part to be removed, as is now done by similar devices for this purpose which are on the market. It is a well-known fact that under existing conditions it is now necessary for the operator to divide his attention between the hoof and the trimmer, whereas with this device the entire interest may be centered on the work to be accomplished.

Of course these pliers may also be operated when picking up the animal's hoof, as is usually done by a horseshoer. In this event the device may be used either with or without removing the handles 12 from the shanks 11.

I am aware that numerous devices for this purpose are now on the market, but am not aware of any being in existence which enable the operator to work from a point of safety, and at the same time render it possible for him to exert so great a leverage upon the work as is possible with my invention.

While I have thus illustrated and described my invention it is not my desire to limit myself to this precise form or method of application, but intend that it shall cover all forms and modifications that fall fairly within the appended claim.

What I claim as new and desire to protect by Letters Patent of the United States, is:

In a hoof trimmer, the combination of a pair of pivoted crossed arms which are equipped at the same ends with long wooden handles and having at each of the opposite ends a cutting edge forming an obtuse angle to the plane of the handles and forming an acute angle to the pivot axis, said cutting edge having convex faces and convex tips.

JACOB J. GILBERT.